US012752435B2

(12) United States Patent
Wintergerst

(10) Patent No.: US 12,752,435 B2
(45) Date of Patent: Oct. 6, 2026

(54) GRIPPER ASSEMBLY WITH CONSECUTIVE PRODUCT CARRIERS

(71) Applicant: MULTIVAC SEPP HAGGENMÜLLER SE & CO. KG, Wolfertschwenden (DE)

(72) Inventor: Bernd Wintergerst, Hawangen (DE)

(73) Assignee: MULTIVAC SEPP HAGGENMÜLLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 18/912,394

(22) Filed: Oct. 10, 2024

(65) Prior Publication Data

US 2025/0121511 A1 Apr. 17, 2025

(30) Foreign Application Priority Data

Oct. 11, 2023 (DE) ......................... 102023127730.8

(51) Int. Cl.
*B25J 15/00* (2006.01)

(52) U.S. Cl.
CPC ....... *B25J 15/0052* (2013.01); *B25J 15/0004* (2013.01)

(58) Field of Classification Search
CPC .... B25J 11/0045; B25J 15/0014; B65G 47/90
(Continued)

(56) References Cited

U.S. PATENT DOCUMENTS 3,593,860 A * 7/1971 Brenner ................ B65G 57/06 271/189
4,124,128 A * 11/1978 Adams .................. B65G 57/06 198/374

(Continued)

FOREIGN PATENT DOCUMENTS

DE 102012009649 A1 11/2013
DE 102013015020 A1 3/2015

(Continued)

OTHER PUBLICATIONS

European Search Report, Application No. EP 24205834.5, Applicant: Multivac Sepp Haggenmueller SE & Co. KG, Feb. 12, 2025 (with English machine translation) (22 pages).

(Continued)

*Primary Examiner* — Gregory W Adams
(74) *Attorney, Agent, or Firm* — BROOKS KUSHMAN P.C.

(57) ABSTRACT

A gripper assembly comprises a main body for attachment to a travel device, a first gripper attached to the main body and a second gripper attached to the main body. The first gripper comprises a first product carrier and a first drive configured to move the first product carrier parallel to a transverse direction between a first release position and a first receiving position. The second gripper comprises a second product carrier and a second drive configured to move the second product carrier parallel to the transverse direction between a second release position and a second receiving position. The first and second grippers are located consecutively along a longitudinal direction perpendicular to the transverse direction, so that the first and second product carriers jointly form at least part of a common product receiving surface when the first and second product carriers are in the first and second receiving positions, respectively.

17 Claims, 4 Drawing Sheets

(58) Field of Classification Search
USPC ........................................................ 294/67.33
See application file for complete search history.

(56) References Cited

U.S. PATENT DOCUMENTS

| | | | | | |
|---|---|---|---|---|---|
| 4,384,813 | A * | 5/1983 | Smith | B65G 57/081 198/374 |
| 4,778,323 | A * | 10/1988 | Salts | B65G 57/06 100/264 |
| 5,803,706 | A * | 9/1998 | Achelpohl | B65G 57/035 414/794.4 |
| 6,129,504 | A * | 10/2000 | Gammerler | B65H 31/32 414/792.9 |
| 7,628,575 | B2 * | 12/2009 | Gammerler | B65G 57/03 414/349 |
| 8,628,131 | B2 * | 1/2014 | Lang | B25J 11/0045 294/197 |
| 9,914,601 | B2 * | 3/2018 | Morency | B65G 61/00 |
| 11,059,184 | B2 * | 7/2021 | Pedersen | B65G 47/90 |
| 2009/0317221 | A1 | 12/2009 | Hawes | |
| 2014/0031978 | A1 * | 1/2014 | Takata | B25J 15/0004 700/245 |
| 2023/0020113 | A1 | 1/2023 | Powell et al. | |

FOREIGN PATENT DOCUMENTS

| | | | | | |
|---|---|---|---|---|---|
| DE | 102015122392 | A1 | | 6/2017 | |
| EP | 4059672 | A1 | | 9/2022 | |
| GB | 2066201 | A | * | 7/1981 | B65G 57/06 |
| IT | 201800010184 | A1 | | 5/2020 | |
| JP | 2006168817 | | * | 6/2006 | |
| JP | 2006168817 | A | * | 6/2006 | B65G 5/06 |

OTHER PUBLICATIONS

German Search Report, DE Application No. 102023127730.8, dated Aug. 20, 2024, Applicant: Multivac Sepp Haggenmuller SE & Co. KG (with English machine translation) (16 pages).

* cited by examiner

GRIPPER ASSEMBLY WITH CONSECUTIVE PRODUCT CARRIERS

CROSS-REFERENCE TO RELATED APPLICATIONS

This application claims foreign priority benefits under 35 U.S.C. § 119 (a)-(d) to German patent application number DE 10 2023 127730.8, filed Oct. 11, 2023, which is incorporated by reference in its entirety.

TECHNICAL FIELD

The disclosure relates to the field of gripper assemblies for handling products, in particular for handling food products.

BACKGROUND

EP 4 059 672 A1 discloses a gripper assembly for attachment to a robotic device. The gripper assembly comprises a first jaw and a second jaw which are movable relative to one another from a gripping position to an open position. To release a food product, the first jaw is moved relative to the second jaw from the gripping position to the open position so that one side of the food product is not supported by the first jaw while another side of the food product temporarily rests on the second jaw, resulting in the food product tilting about a longitudinal axis of the food product when the food product is dropped from between the two jaws.

SUMMARY

It is an object of the disclosure to provide a way of transporting or positioning products, in particular positioning products in a desired position and/or orientation.

According to a first aspect of the disclosure, a gripper assembly is provided. The gripper assembly comprises a main body, a first gripper, and a second gripper. The main body is configured for attachment to a travel device. The first gripper and the second gripper are attached to the main body. The first gripper comprises a first product carrier and a first drive. The first drive is configured to move the first product carrier parallel to a transverse direction between a first release position and a first receiving position. The transverse direction is defined relative to the main body. The second gripper comprises a second product carrier and a second drive. The second drive is configured to move the second product carrier parallel to the transverse direction between a second release position and a second receiving position. A longitudinal direction is perpendicular to the transverse direction. The first gripper and the second gripper are disposed consecutively along the longitudinal direction so that the first product carrier and the second product carrier jointly form at least part of a common product receiving surface when the first product carrier is in the first receiving position and the second product carrier is in the second receiving position.

The first drive can be configured to move the first product carrier parallel to the transverse direction from the first release position to the first receiving position and to thereby slide the first product carrier under a product to be received.

The second drive can be configured to move the second product carrier parallel to the transverse direction from the second release position to the second receiving position and to thereby slide the second product carrier under the product to be received.

The first product carrier and the second product carrier can be slid under the same product to be received so that the product is received on the common product receiving surface formed at least in part by the first product carrier and the second product carrier.

Since the first gripper and the second gripper are disposed consecutively along the longitudinal direction, a first section of the product can lie on the first product carrier, while a second section of the product disposed along the longitudinal direction behind the first section of the product is lying on the second product carrier.

When the first product carrier is in the first receiving position and the second product carrier in the second receiving position, the first product carrier and the second product carrier can be disposed consecutively along the longitudinal direction, in particular be disposed consecutively in a linear manner. When the first product carrier is in the first receiving position and the second product carrier in the second receiving position, the first product carrier and the second product carrier can lie in a common plane.

When the first product carrier is in the first release position and the second product carrier is in the second release position, then the first product carrier and the second product carrier can be disposed consecutively along the longitudinal direction, in particular be disposed consecutively in a linear manner. When the first product carrier is in the first release position and the second product carrier in the second release position, then the first product carrier and the second product carrier can lie in a common plane.

The first drive can be configured to move the first product carrier in a first direction parallel to the transverse direction from the first release position to the first receiving position. The second drive can be configured to move the second product carrier in the first direction parallel to the transverse direction from the second release position to the second receiving position.

The first drive can be configured to move the first product carrier in a second direction parallel to the transverse direction from the first receiving position to the first release position. The second drive can be configured to move the second product carrier in the second direction parallel to the transverse direction from the second receiving position to the second release position. The second direction can be opposite to the first direction.

The transverse direction can be a horizontal direction or a substantially horizontal direction. The longitudinal direction can be a horizontal direction or a substantially horizontal direction.

The first drive can be configured to move the first product carrier from the first receiving position in the direction toward the first release position in order to pull the first product carrier away from under a product lying on the common product receiving surface.

The second drive can be configured to move the second product carrier from the second receiving position in the direction toward the second release position in order to pull the second product carrier away from under a product received on the common product receiving surface.

The first product carrier and the second product carrier can be movable separately from one another by the first drive and the second drive, in particular can be moved independently of one another. By moving a product carrier, a product received on the common product receiving surface can be acted upon locally in a selective manner. By suitably moving the first product carrier and/or the second product carrier, a motion of a product lying on the common product receiving surface can be caused, promoted or influenced.

The second drive can be configured to move the second product carrier from the second receiving position in the direction toward the second release position while the first product carrier remains in the first receiving position. The second product carrier can be moved away from under a part of a product lying on the common product receiving surface, while the first product carrier remains under another part of the product and supports the other part of the product. The part of the product that is no longer supported by the second product carrier can tilt or fold downwards, which can cause or promote a rotational motion of the product. The rotational motion of the product can be a rotational motion about an axis of rotation that is parallel to the transverse direction. When the product is dropped, the rotational motion can result in the product arriving on a depositing surface in a different orientation than it was lying on the common product receiving surface. For example, when the product is dropped from the gripper assembly onto a depositing surface, it can perform a rotation about the axis of rotation, in particular a rotation of 180 degrees or at least substantially 180 degrees.

The second drive can be configured to move the second product carrier from the second receiving position completely to the second release position, while the first product carrier remains in the first receiving position.

The product can be dropped over an edge of the first product carrier which points in the direction of the second product carrier at least when the first product carrier is present in the first receiving position and the second product carrier in the second receiving position. The edge can extend parallel to the transverse direction or extend at least substantially parallel to the transverse direction.

The first drive and the second drive can be configured to start a motion of the first product carrier from the first receiving position to the first release position and a motion of the second product carrier from the second receiving position to the second release position in a time-staggered manner. For example, the motion of the second product carrier from the second receiving position to the second release position can start prior to the motion of the first product carrier from the first receiving position to the first release position. By pulling the second product carrier at least in part away from under a product lying on the common product receiving surface, a tendency of the product can be caused to rotate about an axis of rotation running parallel to the transverse direction. If the first product carrier is then also pulled away from under the product, the product can be dropped onto a depositing surface, where the previously caused tendency to rotate can lead to a rotation about the axis of rotation, in particular to a rotation of 180 degrees or at least substantially 180 degrees about the axis of rotation.

The motion of the first product carrier from the first receiving position to the first release position and the motion of the second product carrier from the second receiving position to the second release position can take place at least in part in temporal overlap, even if the motions are started in a time-staggered manner.

The first drive and the second drive can be configured to move the first product carrier from the first receiving position to the first delivery position and, synchronously therewith, to move the second product carrier from the second receiving position to the second delivery position. The first product carrier and the second product carrier can be pulled in synchronism with one another away from under a product lying on the common product receiving surface. This makes it possible to drop the product onto a depositing surface without rotation, in particular without rotation about an axis of rotation extending along the transverse direction.

The gripper assembly can preferably be operated in a first mode of operation and in a second mode of operation. The first drive and the second drive can be configured to move the first product carrier from the first receiving position to the first delivery position and, synchronously therewith, to move the second product carrier from the second receiving position to the second delivery position in the first mode of operation. The first drive and the second drive can be configured to move the second product carrier from the second receiving position in the direction toward the second release position, while the first product carrier remains in the first receiving position, in the second mode of operation. In the first mode of operation, a product lying on the common product receiving surface can be dropped onto a depositing surface without rotation, in particular without rotation about an axis of rotation extending along the transverse direction. In the second mode of operation, a product lying on the common product receiving surface can be dropped onto a depositing surface with rotation, in particular with rotation about an axis of rotation extending along the transverse direction.

The gripper assembly can comprise a control device. The control device can be configured to control the first drive and the second drive. The control device can be configured to determine or receive the information whether a product drop with rotation or a product drop without rotation is to take place. The control device can control the first drive and the second drive as a function of whether a product drop with rotation or a product drop without rotation is to take place. The control device can operate the gripper assembly in the first mode of operation if a product drop without rotation is to take place. The control device can operate the gripper assembly in the second mode of operation if a product drop with rotation is to take place.

The product can be a food product. The product can comprise, for example, a piece of meat or a piece of fish.

The product can have a product upper side and a product underside. The product upper side and the product underside can be formed differently. For example, the product can be a piece of meat, one side (upper side or underside) of which has a skin surface and the other side (underside or upper side) of which has a meat surface. For example, the product can be formed as a piece of fish, one side (upper side or underside) of which has a skin surface and the other side (underside or upper side) of which has a meat surface. The gripper assembly can be configured to stack such pieces of fish or meat on top of each other on a depositing surface in such a way that the same sides always lie on top of each other. For example, when processing pieces of fish, contamination of the meat side by scales from a piece of product disposed above or below can be prevented or reduced.

The gripper assembly can comprise a down-holder. The down-holder can comprise a down-holder body and a down-holder drive. The down-holder drive can be configured to move the down-holder body downwards in the direction toward the first product carrier in order to clamp a product between the down-holder body and the first product carrier. The down-holder can prevent the product from slipping on the first product carrier. The down-holder drive can be configured to move the down-holder body upwards in the direction away from the first product carrier in order to release a clamping of the product between the down-holder body and the first product carrier. Releasing the clamping can initiate the product drop.

According to an embodiment, the first gripper and the second gripper are configured as one-sided under-grippers, each of which only comprises a single product carrier. According to a further embodiment, the first gripper and the second gripper are each configured as a pair of gripper jaws, wherein the first gripper and the second gripper each have two product carriers that are disposed opposite one another along the transverse direction.

The first gripper can comprise a third product carrier in addition to the first product carrier. The first product carrier and the third product carrier can be disposed opposite one another along the transverse direction. The first drive can be configured to move the first product carrier and the third product carrier toward one another parallel to the transverse direction in order to move the first product carrier from the first release position to the first receiving position. The first drive can be configured to move the first product carrier and the third product carrier away from one another parallel to the transverse direction in order to move the first product carrier from the first receiving position to the first release position. In the first receiving position, the third product carrier can form at least part of the common product receiving surface. The first product carrier and the third product carrier can be slid under the product from opposite sides when the first product carrier and the third product carrier are moved toward one another to the first receiving position. Gripping under the product from both sides can make it easier to receive the product. The first drive can be configured to move third product carrier in mirror image synchronously with the first product carrier. The first drive can be configured to move the first product carrier and the third product carrier away from one another along the transverse direction so that a drop gap for the product is created between the first product carrier and the third product carrier.

The second gripper can comprise a fourth product carrier in addition to the second product carrier. The second product carrier and the forth product carrier can be disposed opposite one another along the transverse direction. The second drive can be configured to move the second product carrier and the fourth product carrier toward one another parallel to the transverse direction in order to move the second product carrier from the second release position to the second receiving position. The second drive can be configured to move the second product carrier and the fourth product carrier away from one another parallel to the transverse direction in order to move the second product carrier from the second receiving position to the second release position. In the second receiving position, the fourth product carrier can form at least part of the common product receiving surface. The second product carrier and the fourth product carrier can be slid under the product from opposite sides when the second product carrier and the fourth product carrier are moved toward one another to the second receiving position. Gripping under the product from both sides can make it easier to receive the product. The second drive can be configured to move the fourth product carrier in mirror image synchronously with the second product carrier. The second drive can be configured to move the second product carrier and the fourth product carrier away from one another along the transverse direction so that a drop gap for the product is created between the second product carrier and the fourth product carrier.

If the first product carrier is in the first receiving position and the second product carrier in the second receiving position, a distance between the first product carrier and the second product carrier along the longitudinal direction can be at most 10 cm, or at most 7 cm, or at most 5 cm, or at most 3 cm, or at most 2 cm, or at most 1 cm. The distance can be small enough to prevent the product from dropping through between the first product carrier and the second product carrier.

According to a second aspect of the disclosure, a gripper robot is provided. The gripper robot comprises the gripper assembly of the first aspect of the disclosure and a travel device. The main body is attached to the travel device. The travel device is configured to move the main body in space.

The travel device can move the gripper assembly over a provision surface on which a product is lying. The gripper assembly can receive the product. The travel device can move the gripper assembly with the product being received on the common product receiving surface over a depositing surface. Above the depositing surface, the gripper assembly can drop the product onto the depositing surface with or without rotation.

According to a third aspect of the disclosure, a method for handling products is provided. A product is received on a product receiving surface which is formed jointly at least in part by a first product carrier and a second product carrier. The first product carrier and the second product carrier are attached to a main body. The first product carrier and the second product carrier are disposed consecutively along a longitudinal direction that is defined relative to the main body. The second product carrier is moved relative to the first product carrier parallel to a transverse direction that is perpendicular to the longitudinal direction, wherein the second product carrier is pulled away from under the product while the product is still lying at least in part on the first product carrier so that dropping the product with rotation of the product about an axis of rotation that is parallel to the transverse direction is promoted.

The main body can be moved while the product is being dropped. The motion of the main body can assist the rotation of the product.

The product can be clamped against the first product carrier by way of a down-holder. The clamping can be released to initiate the product drop.

The product receiving surface can be formed by the first product carrier and the second product carrier jointly with a third product carrier and a fourth product carrier. The first product carrier and the third product carrier can be disposed opposite one another along the transverse direction and form a first pair of gripper jaws. The second product carrier and the fourth product carrier can be disposed opposite one another along the transverse direction and form a second pair of gripper jaws. The product carriers of a pair of gripper jaws can be moved synchronously toward one another along the transverse direction or synchronously away from one another along the transverse direction.

A gripper assembly, a gripper robot, and a method for handling products are described. Features, explanations, and descriptions which are illustrated in relation to one of these aspects can be transferred to the other aspects or can be combined with them. The gripper assembly or the gripper robot can be suitable, designed, and/or configured for carrying out the method. The method can be carried out or is carried out by way of the gripper assembly or by way of the gripper robot.

BRIEF DESCRIPTION OF THE DRAWINGS

Embodiments according to the disclosure are described below in more detail with reference to the following drawings.

DETAILED DESCRIPTION

Figure 1:
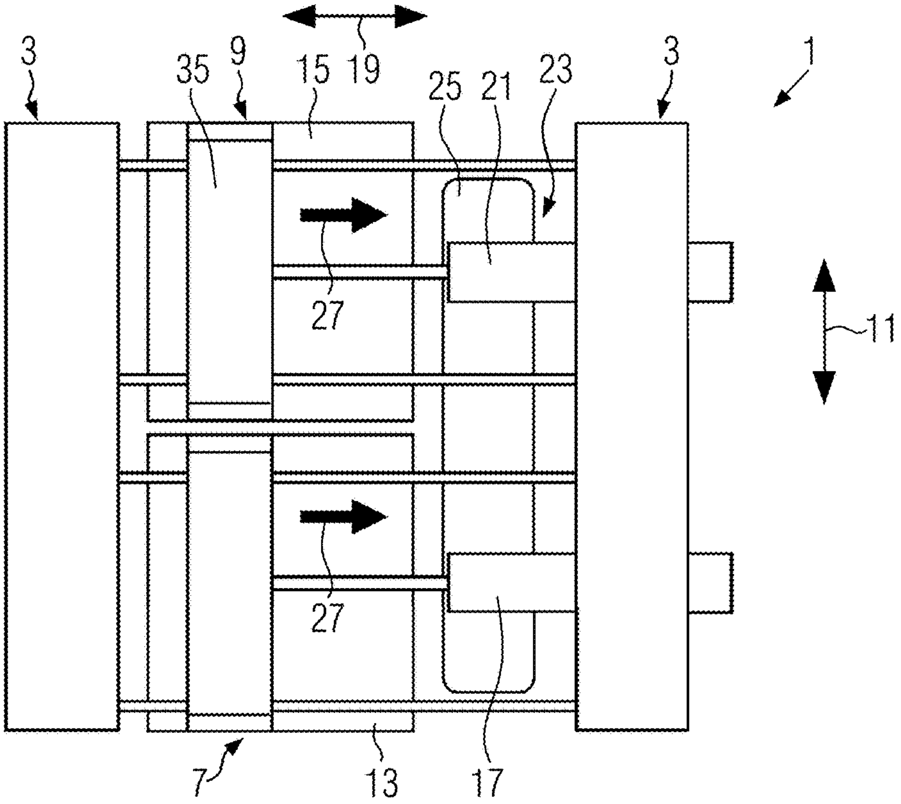
FIG. 1 shows a schematic plan view onto a gripper assembly of a first embodiment prior to the reception of a product.

FIGS. 1 to 5 show a gripper assembly 1 of a first embodiment. Gripper assembly 1 comprises a main body 3 for attachment to a travel device 5 (see FIG. 3). Travel device 5 can be configured, for example, as a robotic arm and move main body 3 in space. A first gripper 7 and a second gripper 9 are attached to main body 3. First gripper 7 and second gripper 9 are arranged consecutively along a longitudinal direction 11. First gripper 7 comprises a first product carrier 13 and second gripper 9 comprises a second product carrier 15. First gripper 7 comprises a first drive 17 (e.g., actuator, such as an electric actuator or pneumatic actuator). First drive 17 is configured to move first product carrier 13 parallel to a transverse direction 19 between a first release position and a first receiving position. Second gripper 9 comprises a second drive 21 (e.g., actuator, such as an electric actuator or pneumatic actuator). Second drive 21 is configured to move second product carrier 15 parallel to transverse direction 19 between a second release position and a second receiving position. Longitudinal direction 11 and transverse direction 19 are each defined relative to main body 3. Longitudinal direction 11 and transverse direction 19 are perpendicular to each other. Longitudinal direction 11 and transverse direction 19 are preferably horizontal directions.

In FIG. 1, gripper assembly 1 is shown prior to receiving a product 25 lying on a provision surface 23. First product carrier 13 is disposed in the first release position and second product carrier 15 is disposed in the second release position. First product carrier 13 and second product carrier 15 are arranged consecutively along longitudinal direction 11 and lie laterally next to product 25 to be received. As symbolized by arrows 27 in FIG. 1, first product carrier 13 and second product carrier 15 are moved by first drive 17 and second drive 21, respectively, along transverse direction 19 in the direction of the receiving position, which corresponds to a motion to the right-hand side in FIG. 1. First product carrier 13 and second product carrier 15 are slid under product 25, resulting in the operating situation illustrated in FIG. 2.

Figure 2:
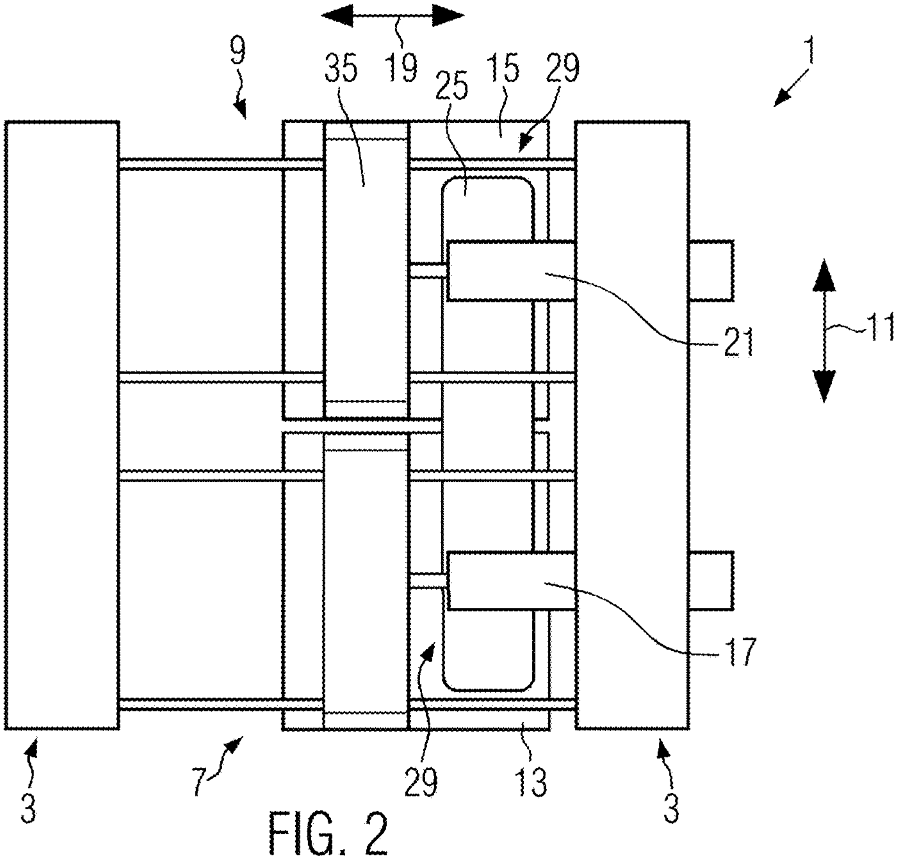
FIG. 2 shows a schematic plan view of a gripper assembly of the first embodiment with the product received.

In FIG. 2, first product carrier 13 is in the first receiving position and second product carrier 15 is in the second receiving position. In FIG. 2, first product carrier 13 and second product carrier 15 jointly form a common product receiving surface 29 on which product 25 is lying.

Figure 3:
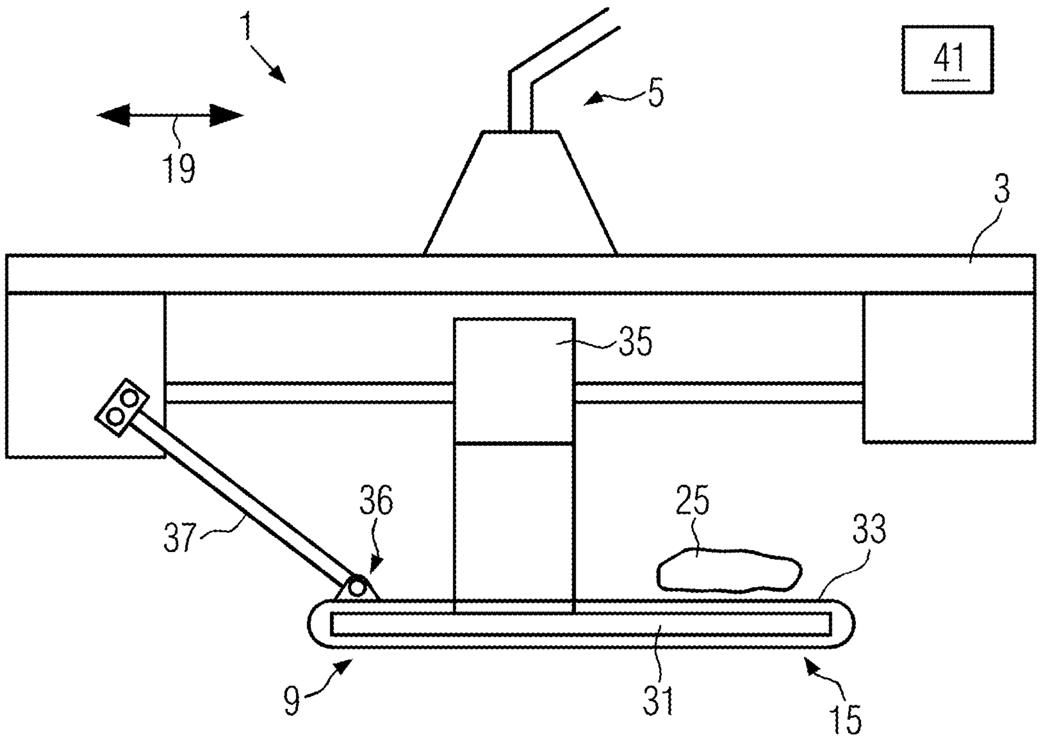
FIG. 3 shows a schematic sectional view of the gripper assembly of the first embodiment with the product received.

FIG. 3 shows a sectional view of gripper assembly 1 in the operating situation shown in FIG. 2 with product 25 being received on common product receiving surface 29. The sectional plane of the view from FIG. 3 is parallel to transverse direction 19 and perpendicular to longitudinal direction 11. As shown in FIG. 3, second product carrier 15 can have a plate-shaped structural element 31 around which a belt 33 is provided circulating along transverse direction 19. Structural element 31 is connected to a carriage 35 which is moved by second drive 21 along transverse direction 19. Belt 33 comprises a holding region 36 which is held stationary in relation to main body 3 by a holding device 37. Product 25 is lying on the upper span of belt 33. Due to the fact that holding region 36 is held stationary relative to main body 3, second product carrier 15 can be slid under product 25 or pulled away from under product 25 by a motion of structural element 31 without a relative motion between product 25 and the upper span of belt 33 along transverse direction 19.

First product carrier 13 can be formed analogously to second product carrier 15 and likewise comprise a structural element 31 and a belt 33. First product carrier 13 and second product carrier 15 can alternatively be formed without belt 33, and product 25 can be lying directly on structural element 31.

After product 25 has been received on common product receiving surface 29, main body 3 with first gripper 7 and second gripper 9 attached to it is moved by travel device 5 over a depositing surface 39. Gripper assembly 1 can drop product 25 onto depositing surface 39 without rotation in a first mode of operation or drop product 25 onto depositing surface 39 with rotation in a second mode of operation. A control device 41 (see FIG. 3) of gripper assembly 1 controls first drive 17 and second drive 21 differently in dependence of whether the product is to be dropped with rotation or without rotation.

Figure 4:
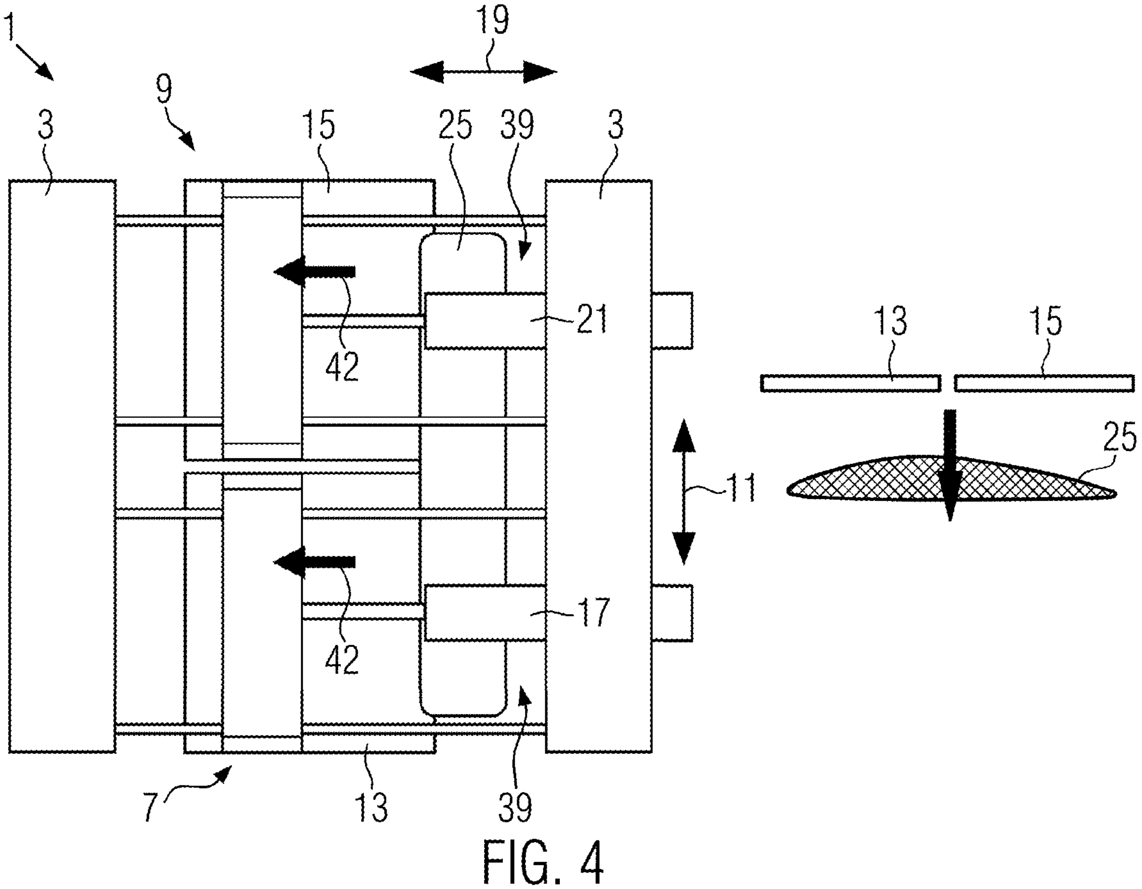
FIG. 4 shows schematic illustrations of the gripper assembly of the first embodiment when the product is dropped without rotation.

FIG. 4 shows product 25 being dropped in the first mode of operation without rotation. First product carrier 13 and second product carrier 15 are moved synchronously with one another from the respective receiving position to the release position. In FIG. 4, this corresponds to a motion of first product carrier 13 and second product carrier 15 away from under product 25 to the left-hand side, as shown by arrows 42. The right-hand part of FIG. 4 schematically shows the resulting product drop in the viewing direction along transverse direction 19.

Figure 5:
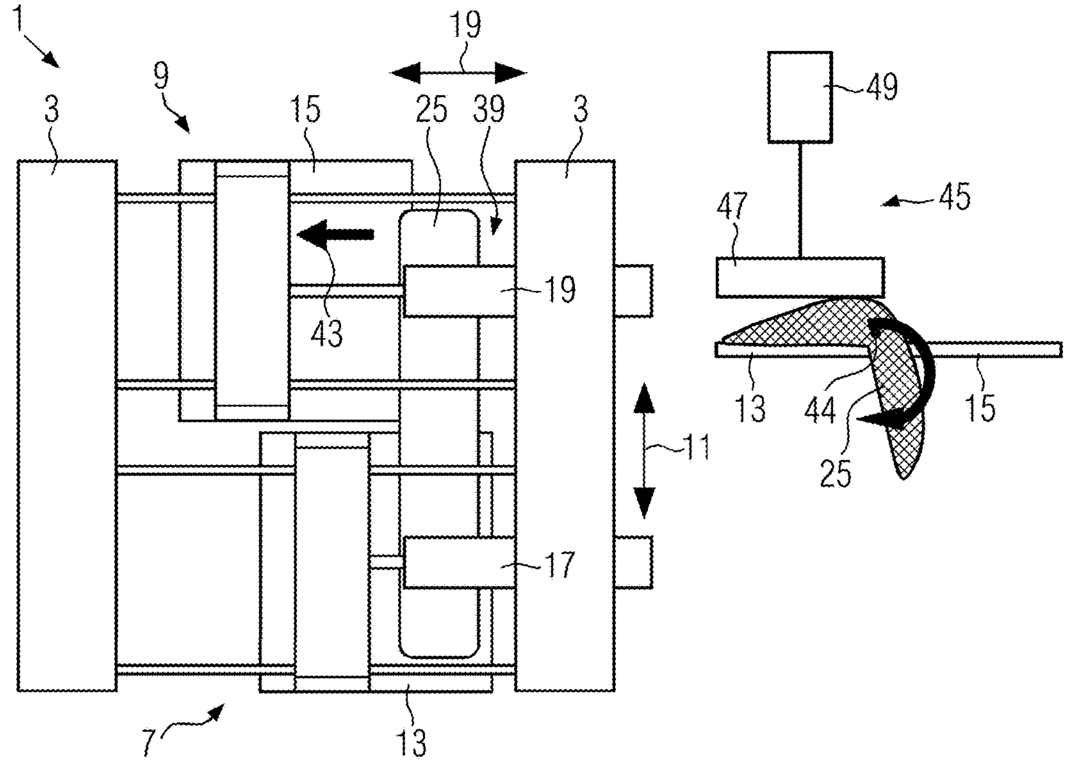
FIG. 5 shows schematic illustrations of the gripper assembly of the first embodiment when the product is dropped with rotation.

FIG. 5 shows the product drop according to the second mode of operation with rotation. Initially only second product carrier 15 is there moved from the second receiving position to the second release position, which is shown in FIG. 5 by arrow 43. First product carrier 13 remains in the first receiving position, at least initially. Second product carrier 15 is therefore pulled away from under a region of product 25, while another region of product 25 is still lying on first product carrier 13. As shown in the right-hand part of FIG. 5, this promotes a tilting motion of product 25 about an axis of rotation 44 that is parallel to transverse direction 19.

According to an embodiment, the motion of second product carrier 15 away from under product 25 can already be sufficient to cause product 25 to drop onto depositing surface 39, and then in particular to perform a rotation of 180 degrees about axis of rotation 44. Optionally, first product carrier 13 can be moved toward the first release position at a time offset from the motion of second product carrier 15 toward the second release position in order to cause product 25 to drop. With a suitable motion of main body 3, which can be initiated by travel device 5, product 25 can optionally be accelerated at a suitable point in time, in particular after moving second product carrier 15 to the second release position, in order to cause product 25 to drop.

A down-holder 45 which comprises a down-holder body 47 and a down-holder drive 49 is optionally provided. After receiving product 25 on common product receiving surface 29, down-holder drive 49 (e.g., actuator, such as an electric actuator or pneumatic actuator) can move down-holder body 47 downwardly onto first product carrier 13 in order to clamp product 25 between down-holder body 47 and first product carrier 13. When product 25 is dropped, down-holder drive 49 can move down-holder body 47 upwards away from first product carrier 13 in order to release the clamping and release product 25 for dropping.

FIGS. 6 to 9 show a second embodiment of gripper assembly 1. The second embodiment differs from the first embodiment substantially in that first gripper 7 comprises a third product carrier 51 in addition to first product carrier 13 and second gripper 9 comprises a fourth product carrier 53 in addition to second product carrier 15. First product carrier 13 and third product carrier 51 are disposed opposite one another along transverse direction 19 and form a first pair of gripper jaws. Second product carrier 15 and fourth product carrier 53 are disposed opposite one another along transverse direction 19 and form a second pair of gripper jaws. Product carriers 13, 51, 15, 53 of a pair of gripper jaws are moved synchronously to each other along transverse direction 19 by a respective drive 17, 21 toward one another or moved synchronously to each other along transverse direction 19 away from one another in order to receive or release product 25, wherein each drive 17, 21 may include one or more actuators, such as electric or pneumatic actuators, for example.

Figure 6:
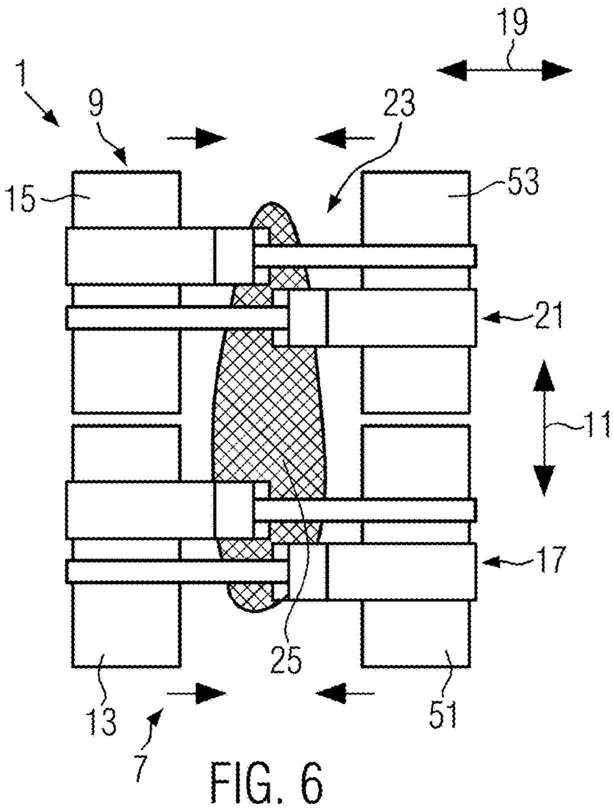
FIG. 6 shows a schematic plan view onto a gripper assembly of a second embodiment prior to the reception of a product.

In FIG. 6, gripper assembly 1 is arranged above provision surface 23 prior to product 25 being received. First drive 17 moves first product carrier 13 and third product carrier 15 toward one another along transverse direction 19 and thus pushes first product carrier 13 and third product carrier 51 from opposite sides under product 15. Just like in the first embodiment, first product carrier 13 is there moved along transverse direction 19 from a first release position to a first receiving position. At the same time, second drive 21 moves second product carrier 15 and fourth product carrier 53 toward one another along transverse direction 19 and thus slides second product carrier 15 and fourth product carrier 53 from opposite sides under product 25. Just like in the first embodiment, second product carrier 15 is there moved from a second release position to a second receiving position.

Figure 7:
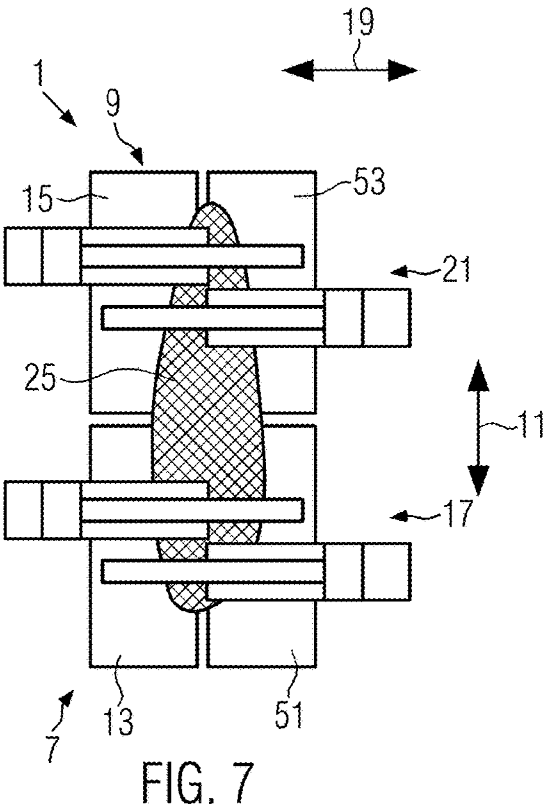
FIG. 7 shows a schematic plan view onto the gripper assembly of the second embodiment with the product received.

FIG. 7 shows gripper assembly 1 after product 25 has been received. Product 25 is lying on a common product receiving surface 29 which in the second embodiment is formed jointly by first product carrier 13, second product carrier 15, third product carrier 51 and fourth product carrier 53.

Figure 8:
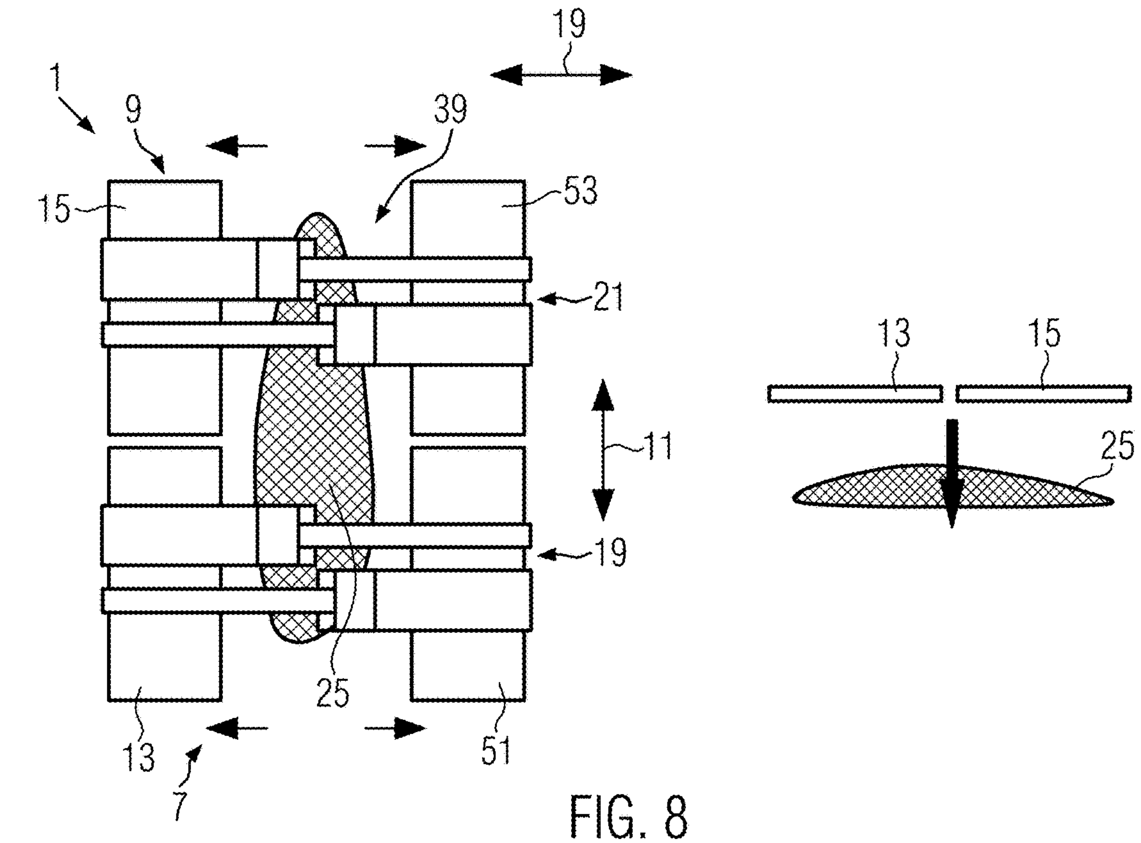
FIG. 8 shows schematic illustrations of the gripper assembly of the second embodiment when the product is dropped without rotation.

FIG. 8 shows the dropping of product 25 without rotation in a first mode of operation according to the second embodiment. First product carrier 13 and third product carrier 51 are there moved away from one another along transverse direction 19 by first drive 17 and thus pulled away from under product 25. Synchronously with this, second product carrier 15 and fourth product carrier 53 are moved away from one another along transverse direction 19 by second drive 21 and thus pulled away from under product 25. As shown in the right-hand part of FIG. 8, product 25 is released and drops down onto depositing surface 39 without rotation.

Figure 9:
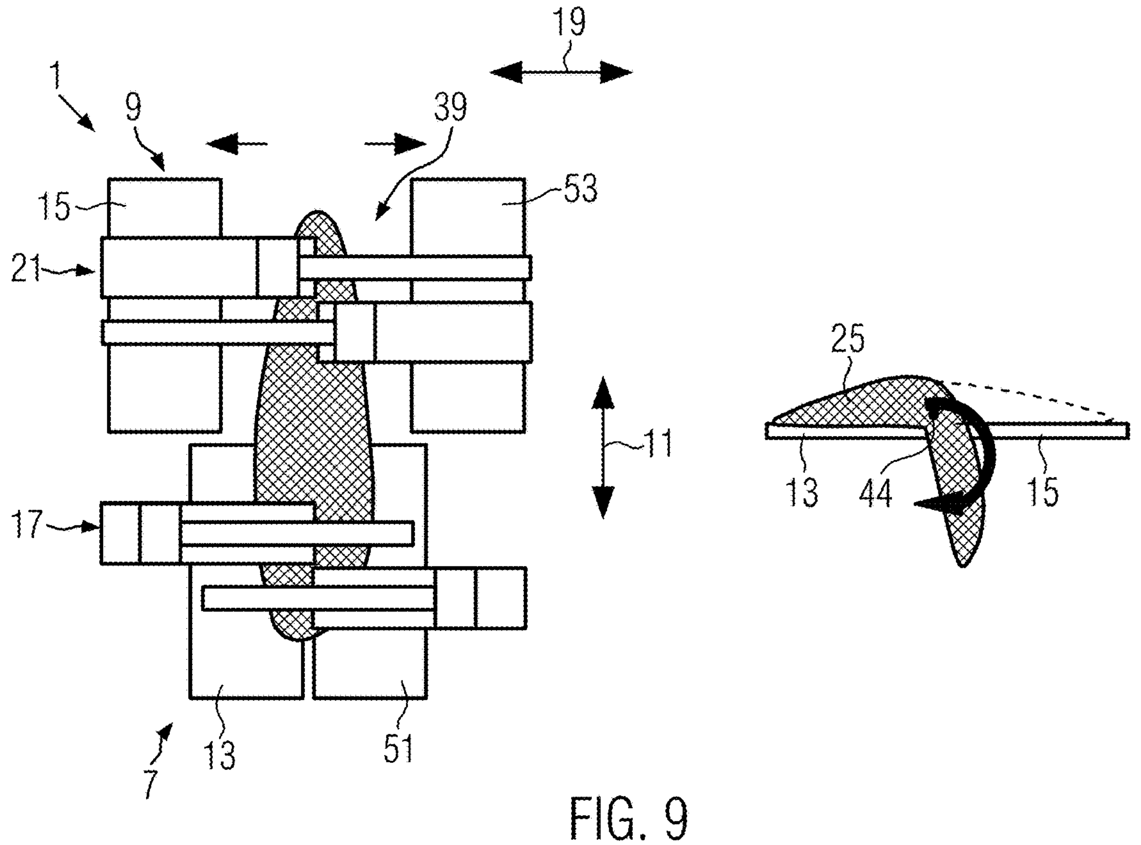
FIG. 9 shows schematic illustrations of the gripper assembly of the second embodiment when the product is dropped with rotation.

FIG. 9 shows the dropping of product 25 with rotation in a second mode of operation according to the second embodiment. Second drive 21 moves second product carrier 15 and fourth product carrier 53 apart along transverse direction 19 and thus away from under product 25, while first product carrier 13 and third product carrier 51 remain in the closed position and continue to carry product 25. As shown in the right-hand part of FIG. 9, this promotes rotation of product 25 about an axis of rotation 44 extending parallel to transverse direction 19.

What is claimed is:

1. A gripper assembly, comprising:

a control device;

a main body configured to be attached to a travel device;

a first gripper attached to the main body; and a second gripper attached to the main body;

wherein the first gripper comprises a first product carrier and a first drive, wherein the first drive is configured to move the first product carrier parallel to a transverse direction that is defined relative to the main body between a first release position and a first receiving position;

wherein the second gripper comprises a second product carrier and a second drive, wherein the second drive is configured to move the second product carrier parallel to the transverse direction between a second release position and a second receiving position;

wherein the first gripper and the second gripper are disposed consecutively along a longitudinal direction that is perpendicular to the transverse direction so that the first product carrier and the second product carrier jointly form at least part of a common product receiving surface when the first product carrier is in the first receiving position and the second product carrier in the second receiving position; and wherein the control device is configured to determine or receive information whether a product drop with rotation or a product drop without rotation is to take place, and to control the first drive and the second drive as a function of whether a product drop with rotation or a product drop without rotation is to take place.

2. The gripper assembly according to claim 1, wherein the second drive is configured to move the second product carrier from the second receiving position completely to the second release position while the first product carrier remains in the first receiving position.

3. The gripper assembly according to claim 1, wherein the first drive and the second drive are configured to start a motion of the first product carrier from the first receiving position to the first release position and a motion of the second product carrier from the second receiving position to the second release position in a time-staggered manner.

4. The gripper assembly according to claim 1, wherein the first drive and the second drive are configured to move the first product carrier from the first receiving position to the first release position and, synchronously therewith, to move the second product carrier from the second receiving position to the second release position.

5. The gripper assembly according to claim 1, wherein the gripper assembly is configured to be operated in a first mode of operation and in a second mode of operation;

wherein the first drive and the second drive are configured to move the first product carrier from the first receiving position to the first release position and, synchronously therewith, move the second product carrier from the second receiving position to the second release position in the first mode of operation; and wherein the first drive and the second drive are configured to move the second product carrier from the second receiving position towards the second release position, while the first product carrier remains in the first receiving position, in the second mode of operation.

6. The gripper assembly according to claim 1, wherein the gripper assembly comprises a down-holder with a down-holder body and a down-holder drive, wherein the down-holder drive is configured to move the down-holder body downwards in a direction toward the first product carrier in order to clamp a product between the down-holder body and the first product carrier.

7. The gripper assembly according to claim 1, wherein the first gripper further comprises a third product carrier, wherein the first product carrier and the third product carrier are disposed opposite one another along the transverse direction, wherein the first drive is configured to move the first product carrier and the third product carrier toward one another parallel to the transverse direction in order to move the first product carrier from the first release position to the first receiving position.

8. The gripper assembly according to claim 1, wherein the second gripper further comprises a fourth product carrier, wherein the second product carrier and the fourth product carrier are disposed opposite one another along the transverse direction, wherein the second drive is configured to move the second product carrier and the fourth product carrier toward one another parallel to the transverse direction in order to move the second product carrier from the second release position to the second receiving position.

9. The gripper assembly according to claim 1, wherein, when the first product carrier is present in the first receiving position and the second product carrier is in the second receiving position, a distance between the first product carrier and the second product carrier along the longitudinal direction is at most 10 cm.

10. The gripper assembly according to claim 1, wherein, when the first product carrier is in the first receiving position and the second product carrier is in the second receiving position, a distance between the first product carrier and the second product carrier along the longitudinal direction is at most 5 cm.

11. The gripper assembly according to claim 1, wherein, when the first product carrier is in the first receiving position and the second product carrier is in the second receiving position, a distance between the first product carrier and the second product carrier along the longitudinal direction is at most 1 cm.

12. A gripper robot, comprising:

the gripper assembly according to claim 1; and a travel device;

wherein the main body is attached to the travel device; and wherein the travel device is configured to move the main body in space.

13. A method for handling products, comprising:

receiving a product on a product receiving surface which is at least in part jointly formed by a first product carrier and a second product carrier, wherein the first product carrier and the second product carrier are attached to a main body and are disposed consecutively along a longitudinal direction that is defined relative to the main body; and moving the second product carrier parallel to a transverse direction that is perpendicular to the longitudinal direction relative to the first product carrier, wherein the second product carrier is pulled away from under the product while the product is still lying at least in part on the first product carrier so that dropping the product with a rotation of the product about an axis of rotation that is parallel to the transverse direction is promoted.

14. The method according to claim 13, wherein the main body is moved while the product is being dropped, wherein the motion of the main body supports the rotation of the product.

15. The method according to claim 13, further comprising clamping the product against the first product carrier by a down-holder, wherein the clamping is released to initiate the product drop.

16. The method according to claim 13, wherein the product receiving surface is formed by the first product carrier and the second product carrier jointly with a third product carrier and a fourth product carrier;

the first product carrier and the third product carrier are disposed opposite one another along the transverse direction and form a first pair of gripper jaws;

the second product carrier and the fourth product carrier are disposed opposite one another along the transverse direction and form a second pair of gripper jaws; and the product carriers of one of the pairs of gripper jaws are moved synchronously toward one another along the transverse direction or are moved synchronously away from one another along the transverse direction.

17. A gripper assembly, comprising:

a main body configured to be attached to a travel device;

a first gripper attached to the main body; and a second gripper attached to the main body;

wherein the first gripper comprises a first product carrier and a first drive, wherein the first drive is configured to move the first product carrier parallel to a transverse direction that is defined relative to the main body between a first release position and a first receiving position;

wherein the second gripper comprises a second product carrier and a second drive, wherein the second drive is configured to move the second product carrier parallel to the transverse direction between a second release position and a second receiving position;

wherein the first gripper and the second gripper are disposed consecutively along a longitudinal direction that is perpendicular to the transverse direction so that the first product carrier and the second product carrier jointly form at least part of a common product receiving surface when the first product carrier is in the first receiving position and the second product carrier in the second receiving position; and wherein the first gripper further comprises a third product carrier, wherein the first product carrier and the third product carrier are disposed opposite one another along the transverse direction, wherein the first drive is configured to move the first product carrier and the third product carrier toward one another parallel to the transverse direction in order to move the first product carrier from the first release position to the first receiving position.

* * * * *